US010506367B2

(12) United States Patent
Best (10) Patent No.: US 10,506,367 B2
(45) Date of Patent: Dec. 10, 2019

(54) IOT MESSAGING COMMUNICATIONS SYSTEMS AND METHODS

(71) Applicant: Best Network Systems Inc., Miami Beach, FL (US)

(72) Inventor: Jules Best, Berkeley, CA (US)

(73) Assignee: Best Network Systems Inc., Miami Beach, FL (US)

(*) Notice: Subject to any disclaimer, the term of this patent is extended or adjusted under 35 U.S.C. 154(b) by 0 days.

(21) Appl. No.: 16/010,386

(22) Filed: Jun. 15, 2018

(65) Prior Publication Data
US 2018/0367946 A1    Dec. 20, 2018

Related U.S. Application Data

(60) Provisional application No. 62/521,193, filed on Jun. 16, 2017.

(51) Int. Cl.
*H04W 4/021* (2018.01)
*G06Q 30/02* (2012.01)
(Continued)

(52) U.S. Cl.
CPC ........ *H04W 4/021* (2013.01); *G06Q 30/0267* (2013.01); *G06Q 30/0269* (2013.01);
(Continued)

(58) Field of Classification Search
CPC ......... H04W 4/80; H04W 4/023; H04W 4/02; H04W 4/021; H04W 40/244; H04W 8/005; H04W 64/00; H04W 84/18; H04W 48/16; H04W 84/12; H04W 4/029; H04W 4/04; H04W 64/003; H04W 4/20; H04W 4/21;
(Continued)

(56) References Cited

U.S. PATENT DOCUMENTS 8,755,824 B1    6/2014 Wang et al.
9,635,118 B1    4/2017 DeLuca et al.
(Continued)

FOREIGN PATENT DOCUMENTS

WO    WO2019118503 A1    6/2019

OTHER PUBLICATIONS

"International Search Report" and "Written Opinion of the International Searching Authority," Patent Cooperation Treaty Application No. PCT/US2018/065013, dated Mar. 4, 2019, 15 pages.
(Continued)

*Primary Examiner* — Daniel Lai
(74) *Attorney, Agent, or Firm* — Carr & Ferrell LLP (57) ABSTRACT

Messaging communications systems and methods are disclosed herein. An example system includes a beacon architecture including a server; and a plurality of beacons arranged around an environment, the server being configured to sense a real-time center of gravity of a communication device from any of the plurality of beacons receiving communications from the communication device, the real-time center of gravity being a location of the communication device within the environment, transmit a notification to the communication device, the notification including a link to content based on the real-time center of gravity, and transmit the content to the communication device based on a selection of the link.

9 Claims, 6 Drawing Sheets

(51) Int. Cl.
*H04W 4/80* (2018.01)
*H04L 29/08* (2006.01)
*H04W 48/12* (2009.01)
*H04W 64/00* (2009.01)
*H04W 4/70* (2018.01)
*H04W 12/02* (2009.01)

(52) U.S. Cl.
CPC ............ *H04L 67/02* (2013.01); *H04L 67/146* (2013.01); *H04L 67/26* (2013.01); *H04L 67/306* (2013.01); *H04W 4/70* (2018.02); *H04W 4/80* (2018.02); *H04W 48/12* (2013.01); *H04W 64/00* (2013.01); *H04W 12/02* (2013.01)

(58) Field of Classification Search
CPC ......... H04W 4/50; H04W 4/00; H04W 4/025; H04W 4/18; H04W 60/04; H04W 48/12; G06Q 30/0277; G06Q 30/0267; G06Q 30/0241; G06Q 30/0201; G06Q 30/0261; G06Q 30/0272; G06Q 30/0207; G06Q 30/0269; G06Q 30/0242; G06Q 30/00; G06Q 30/0224; G06Q 30/0251; G06Q 30/0259; G06Q 30/0255; G06Q 30/0266; G06Q 30/0639; H04L 67/146
See application file for complete search history.

(56) References Cited

U.S. PATENT DOCUMENTS

| | | | |
|---|---|---|---|
| 10,212,174 | B2 | 2/2019 | Muddu et al. |
| 2009/0076966 | A1 | 3/2009 | Bishop et al. |
| 2009/0131079 | A1 | 5/2009 | Sekhar |
| 2009/0264070 | A1 | 10/2009 | Lim |
| 2011/0282724 | A1 | 11/2011 | Hwang |
| 2012/0101952 | A1 | 4/2012 | Raleigh et al. |
| 2012/0110618 | A1* | 5/2012 | Kilar ............ G06Q 30/02 725/34 |
| 2012/0215896 | A1* | 8/2012 | Johannsen .......... G06F 21/44 709/223 |
| 2012/0316940 | A1 | 12/2012 | Moshfeghi |
| 2014/0087712 | A1 | 3/2014 | Danford et al. |
| 2014/0335897 | A1* | 11/2014 | Clem ................ G08G 1/0112 455/456.3 |
| 2014/0351418 | A1* | 11/2014 | Toubiana ............ G06Q 30/02 709/224 |
| 2014/0365304 | A1 | 12/2014 | Showers et al. |
| 2015/0215781 | A1 | 7/2015 | Reed et al. |
| 2015/0248702 | A1* | 9/2015 | Chatterton ......... G06Q 30/0261 705/14.58 |
| 2015/0264051 | A1 | 9/2015 | Hoggan |
| 2015/0324851 | A1 | 11/2015 | Campbell et al. |
| 2016/0088443 | A1 | 3/2016 | Kostka et al. |
| 2016/0180393 | A1* | 6/2016 | Mulye ............... G06Q 30/0261 705/14.58 |
| 2016/0182524 | A1 | 6/2016 | Khosravi et al. |
| 2016/0259932 | A1 | 9/2016 | Lakshmanan et al. |
| 2016/0285903 | A1 | 9/2016 | Hinchliffe et al. |
| 2016/0342906 | A1 | 11/2016 | Shaashua et al. |
| 2017/0161749 | A1 | 6/2017 | Shaikh |
| 2018/0063684 | A1* | 3/2018 | Cheng .................. H04W 4/21 |
| 2018/0101834 | A1* | 4/2018 | Laracey ............. G06Q 20/322 |
| 2018/0176203 | A1* | 6/2018 | Wang ................. H04L 67/141 |
| 2018/0248850 | A1 | 8/2018 | Tee et al. |
| 2018/0330348 | A1 | 11/2018 | Uhr et al. |
| 2018/0351761 | A1 | 12/2018 | Li et al. |
| 2018/0368819 | A1 | 12/2018 | Gogineni |
| 2019/0020637 | A1 | 1/2019 | Andersen et al. |
| 2019/0052659 | A1 | 2/2019 | Weingarten et al. |
| 2019/0182649 | A1 | 6/2019 | Best |

OTHER PUBLICATIONS

Jeon et al., "BLE Beacons for Internet-of-Things Applications: Survey, Challenges and Opportunities," Social Media Lab, the Department of Electrical and Computer Engineering, The Hong Kong University of Science and Technology [online], Nov. 20, 2017 [retrieved on Feb. 4, 2019], Retrieved from the Internet: <URL:http://smedia.ust.hk/luxbeacon/resources/Jeon%20et#20al%20-%202018%20IOTJ.pdf>, pp. 1-18.

"Application," The American Heritage Dictionary of the English Language [online], 2019 [retrieved Jun. 12, 2019], Retrieved from the Internet: <URL:https://ahdictionary.com/word/search.html?q=application>, 1 page.

"Apple Wallet," Wikipedia [online], May 20, 2019 [retrieved Jun. 13, 2019], Retrieved from the Internet: <URL:https://en.wikipedia.org/wiki/Apple_Wallet>, 3 pages.

* cited by examiner

IOT MESSAGING COMMUNICATIONS SYSTEMS AND METHODS

CROSS REFERENCE TO RELATED APPLICATIONS

This non-provisional application claims the benefit and priority of U.S. Provisional Application No. 62/521,193, filed on Jun. 16, 2017 titled "SMARTWATCH COMMUNICATIONS SYSTEM", which is hereby incorporated by reference herein in its entirety including all references and appendices cited therein, for all purposes.

FIELD

The present disclosure is related generally to messaging architectures, and more specifically, but not by limitation to systems and methods that allow for messaging using a distributed architecture (such as Internet-of-Things "IOT"), where end point devices (user equipment "UE") can transmit and receive notifications and content within the distributed architecture without having to install an application to enable the such messaging and content delivery services.

SUMMARY

According to some embodiments, the present disclosure is directed to a method comprising receiving a request for content by a beacon architecture from a communication device that is in short-range communication proximity to the beacon architecture; transmitting a token to the communication device that allows for delivery of notifications to the communication device using a native notification functionality of the communication device; transmitting a notification to the communication device, the notification comprising a link to the content, the notification being displayed through the native notification functionality and without the use of an application; and transmitting the content to the communication device based on a selection of the link.

According to some embodiments, the present disclosure is directed to a system comprising a beacon architecture comprising: a server; and a plurality of beacons arranged around an environment, each of the plurality of beacons being associated with a dedicated logical link that is used to provide content; the server being configured to: sense a real-time center of gravity of a communication device from any of the plurality of beacons receiving communications from the communication device, the real-time center of gravity being a location of the communication device within the environment; transmit a notification to the communication device, the notification comprising the fixed link to the content based on the real-time center of gravity; and transmit the content to the communication device based on a selection of the fixed link.

According to some embodiments, the present disclosure is directed to a near-field communications system comprising: a wearable electronic device associated with a user identification; a plurality of beacons in communication with the wearable electronic device via a low level protocol, wherein each beacon of the plurality of beacons determines a distance between the wearable electronic device and the beacon; at least one sensor in communication with the wearable electronic device via the low level protocol, the at least one sensor taking measurements in real time, comparing the measurements to a predetermined threshold, and performing an operation if the measurements exceed the predetermined threshold; at least one dongle in communication with the wearable electronic device via the low level protocol, and in communication with a display system; and at least one central server having a controller with at least one processor coupled to memory, the controller determining a location of the wearable electronic device based on the plurality of distances between the wearable electronic device and the plurality of beacons, wherein the at least one central server communicates with the wearable electronic device, the plurality of beacons, the at least one sensor and the at least one dongle through a Centralized Radio Access Network (C-RAN) architecture via the low level protocol, and the at least one central server transmits targeted content to the wearable electronic device based on the location of the wearable electronic device and sends a notification to the user if the location of the wearable electronic device crosses a virtual boundary.

According to some embodiments, the present disclosure is directed to a communications system comprising a beacon in short range wireless communication with a mobile device; a backend system that communicates with the mobile device through use of the beacon; wherein the beacon is configured to transmit a PUSH notification to the mobile device that includes a URL to a resource provided by the backend system; and wherein the backend system is configured to determine if the mobile device has a fingerprint when a browser session is created using the URL, wherein if no fingerprint for the mobile device exists the backend system creates a fingerprint for the mobile device and transmits the fingerprint for storage on the mobile device, the backend system being further configured to create a behavioral profile for a user of the mobile device and transmit targeted advertisements to the mobile device via the beacon, the targeted advertisements being generated in accordance with the behavioral profile.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, embodiments of the present disclosure are directed to messaging architectures and methods, and more specifically, but not by limitation to systems and methods that allow for messaging using a distributed architecture. In some embodiments end point devices (user equipment "UE" or also referred to as a communication device) can transmit and receive content relative to the distributed architecture without having to install an application to enable the messaging services. These UEs can send and receive messages using a low level protocol that is native to the individual UE. For example, the low level protocol can include a native notification functionality. For example, in iOS™ a native notification functionality is available through the Apple Wallet™ functionality using a digital wallet pass. In Android™ operating systems, a native notification functionality includes a notifications panel functionality.

Each type of communication device comprises its own unique native notification functionality (based on OS) and the messaging architectures disclosed herein can be adapted to communicate with each of these native notification functionalities to deliver content to UEs without requiring the UE to install an application in order to send and receive messages such as notifications and/or content. In this way a content delivering party such as a merchant can transmit messages to a UE without requiring the UE to install an application that is specific to the merchant. These features provide a technical solution to a technical problem arising from the inability of content providers to deliver content to UEs without requiring the UE to install and execute a specific application. In one example, a merchant typically creates an application in order to deliver content or offers to interested parties/devices. This requires an interested party to install an application on their UE in order to receive these offers/content. This is a major hurdle to adoption both for the interested party and the merchant. The interested party must take time to install and configure an application from the merchant. Correspondingly, the merchant must create various versions of their application in order to serve devices having different operating systems and device configurations. Each of these applications requires constant maintenance by the merchant in response operating system and/or device specific changes which can occur on a frequent basis.

Utilizing a low-level and native protocol or notification functionality of each specific device and/or operating system rather than a specific application allow for provision of notifications and/or content to a UE outside of traditional application-based approaches.

Also, in some embodiments, the systems and methods used herein provide for the ability to provide targeted content to UEs without collecting personally identifiable information of an end user of that UE.

Services provided by systems disclosed herein are based on, but are not exclusively limited to, near-field communications. Tools for service offerings include System on Chip (SoC) embedded devices, wearables, smartwatches, sensors, beacons, dongles, and customer cell phones (e.g., Smartphones). General aspects allow a chip wearer to perform simple tasks such as open automated doors, authorize payments, verify identity, use of elevators, and so forth. These chips also allow a backend system to identify a person's location within a monitored space and take action based on location and a database of the individual's preferences, such as when a locational center of gravity is determined and used, as will be disclosed herein.

A centralized radio access network (C-RAN) is used in some embodiments. A radio system as utilized herein is modular and leverages multi band, multi-layer, and multi standards that can evolve to 5G network capabilities.

In one or more embodiments, the electronic devices comprise wearable electronic devices, sensors, beacons and dongles that communicate with each other via low level protocols. The wearable electronic devices may comprise smartwatches associated with identification information of a user. The electronic devices communicate through a low level protocol, such that each device has the ability to pass messages and information from one device to any other device. For example, in the event of an emergency, first responders communicate through a Centralized Radio Access Network (C-RAN) utilizing each electronic device as a node which can pass important messages and information from the first responders to a victim or other user and vice versa. In certain embodiments, the system and method use a plurality of beacons to determine a location of the wearable electronic device in real time. In other embodiments, the system and method use a dongle coupled to a display system to send targeted content to a nearby user.

In general, the present disclosure is directed to a wearable electronic device that communicates via near-field communications with beacons, sensors, dongles, mobile computing devices and other electronic devices. The present disclosure couples smartwatch devices with stationary electronic devices, mobile computing devices, and Internet of Things (IoT) capable devices to provide targeted services and capabilities to a user.

In an exemplary embodiment, a hotel or other related establishment offers a smartwatch of the present disclosure to visitor or patron users. The smartwatch has an identification associated with the user. Various devices throughout the establishment will recognize the smartwatch as being associated with the user as the smartwatch enters a predetermined range of communication of each device. In certain embodiments, the device is an electronic door lock sensor which is operable to switch from a locked state to an unlocked state, or vice versa, either upon detecting the presence of a predetermined smartwatch or upon receiving a signal from the smartwatch of the user. In other embodiments, the user authorizes payments at businesses, provides personal identification information, or controls an elevator via the smartwatch. It is to be understood that present disclosure is not limited to a hotel environment. In certain embodiments, the smartwatch also communicates with other electronic devices on the Centralized Radio Access Network (C-RAN), such as electronic locking devices in vehicles or other buildings. The smartwatch and other electronic devices comprise embedded systems having Radio Frequency (RF) modules that facilitate transmitting and receiving radio signals between two or more devices. In some embodiments, the embedded systems use a Software-Defined Radio (SDR) radio communication system.

The smartwatch, sensor, beacon, and dongle communicate via near-field communications through the C-RAN. Each device comprises a chip designed with two-way communications capability through either cellular, WiFi, Bluetooth, ZigBee, a mesh network or other suitable communication protocol. In particular, each device communicates through a low level protocol such as ZigBee, Bluetooth, or other suitable protocol. As such, in the event of a natural disaster or other emergency in which higher level protocols such as WiFi may be unable to function, the electronic devices of the present disclosure will still have the ability to communicate via the low level protocol. Each chip has a communication range which varies from a very short distance measured in inches, to a medium range of around thirty feet. For example, a chip with a small range is better suited for communicating with electronic door locks and vendor purchases such that the device receiving the signal recognizes the specific chip associated with the user.

The smartwatch or other wearable electronic device comprises both short range and medium range near-field communications. An example computer system that may be used with the smartwatch is illustrated and described with respect to FIG. 7. In one or more embodiments, the smartwatch also comprises a WiFi hotspot adapter, at least one microphone, GPS, and a camera. The smartwatch may take text or audio input in a first language, translate the input into an output in a second language in real time, and provide the user with the translated output. In certain embodiments, the smartwatch comprises a plurality of applications which allow the user to confirm purchases, respond to offers, receive texts and e-mails and see various displays.

In some embodiments, the user establishes a virtual boundary or "geo fence" that contains the smartwatch. For example, a parent can establish a child safety zone and receive notifications if his or her child leaves the safety zone. In certain embodiments, the user draws a virtual boundary through an application on a computing device that defines the geographical boundaries of the safety zone. When the communication system detects that the GPS coordinates of the smartwatch are outside of the virtual boundary, it sends a notification to the user.

In other embodiments, the smartwatch also comprises various sensors and buttons that trigger alerts. Such alerts may trigger upon removal of the smartwatch, crossing a virtual boundary, pressing a panic or emergency button, or other suitable triggers. In certain embodiments, the smartwatch communicates the alerts and notifications via the low level protocol, such that the alert is relayed among one or more devices until it reaches the proper recipient (the local police authorities, emergency responders, parents, etc.).

The sensors comprise electronic devices that test for a condition and perform an operation if the condition is satisfied. In particular, the electronic devices test pass/fail normal operating conditions and execute pass/fail testing in real time per each process event. An example of such a pass/fail testing is comparing a real time measurement to a predetermined threshold. If the real time measurement exceeds the predetermined threshold, the sensor will perform the operation, such as transmit a signal or activate an alarm. Sensors which communicate with the smartwatch and other electronic devices of the present disclosure include door locks, elevator controls, carbon monoxide sensors, Geiger counter, explosive/radiation detectors, thermostats and other heat sensors, motion detectors, among other electronic sensors. The sensors also communicate via a low level protocol and are capable of passing messages and information as a node to and from other devices of the present disclosure.

In one example of a sensor, a water sensor is provided that can be associated with a joint of a pipe. For example, at each point of connection between segments of pipe or a connection to a fixture or valve, a water sensor is wrapped around the pipe. The water sensor is capable of detecting the presence of water and transmitting a notification to a proximate device or a remote device through beacon communication. That is, the beacon architectures disclosed herein can include various sensors for electricity, power, air, water, fire, emergency, biometric information, and so forth. Notifications regarding any of these physical conditions can be reported using the application-less notification features described herein.

In various embodiments, the present disclosure can provide notifications through a third-party notification or emergency reporting system such as FirstNet. The beacon architectures of the present disclosure can be configured to communicate with these and other first responder/emergency systems and provide notification in an application-less manner as described herein. These features also allow for public service messaging and endpoints using communications and wireless emergency alerts (WEA) for provision of information to tourist and citizens based on their geolocation.

Beacons comprise location and communication systems and are in communication with the smartwatches, sensors, display systems, dongles, and other computing devices. The beacons are mesh beacons, in that each beacon also communicates with other beacons. In some embodiments, the beacon transmits updates to at least one of other beacons, smartwatches, sensors, display systems and dongles.

In certain embodiments, the communications system identifies a location of the user within a monitored space using the mesh beacons. Each beacon receiving communications from a smartwatch determines a distance between the smartwatch and the beacon. The communication system, through a controller, determines a location of the smartwatch in real time based upon the plurality of distances calculated and a predetermined location of each beacon. In some embodiments, the communication system determines a center of gravity of the beacons receiving communications from the smartwatch to determine the location of the smartwatch.

Upon determining the location of the user by identifying the location of the smartwatch in real time, the communication system can text, email or otherwise send the user targeted content based on the user's location and proximity to certain attractions. A central server receives updates on the location of the user in real time, and then sends out alerts, notifications and targeted content. The system uses a hierarchy of multiple protocols: if certain protocols are unavailable to the system, the system automatically switches to a low level protocol or vice versa to a high level protocol.

The communication system stores at least one business rule, a condition and a trigger for activating the delivery of targeted content. For example, if the communication system detects that a user is walking in front of a gift shop, the communication system will send the user a notice of an impulse sale or other deal at the gift shop. Here, the business rule and condition is created by the administrators of the gift shop which states an impulse sale is available for fifteen minutes to customers who meet particular user criteria. The trigger occurs when the location of the user, particularly the smartwatch associated with the user, is identified as being within a predetermined distance of the gift shop. In certain embodiments, the communication system determines targeted content based on the user's location and information regarding the user's purchases or attended events. The information may be stored in a database coupled to the communication system via a computer network.

As such, the user is more likely to act upon the deal and targeted content because the offer is immediately relevant. The targeted content may comprise a deal with a short time limit, on the order of minutes, because the user will be capable of acting upon the deal since the content is targeted to the user's needs in real time.

In some embodiments, a UE can include a family security tracker use case and specifically a family security tracker for kids. In some embodiments, a smartwatch can be used as for healthcare, for hospitality and resorts, within an IoT for education, and in conjunction with a system comprising a merchandise security tracker and geofence.

Another use case of the present disclosure is in universities or schools which issue each student a smartwatch device along with their identification card. The smartwatch would interact with various sensors distributed throughout the school, such that the student would only have access to areas in which they have permission. Furthermore, in the event of an emergency, first responders have a way in which they can validate an identity of a student, determine a location of the student, and determine how they can reach the student.

In some embodiments a system of the present disclosure can comprise a smartwatch, sensor(s), beacon(s), dongle(s) in an example communications system.

Some embodiments of the present disclosure are directed to a system for delivering targeted advertisements to mobile devices using a beacon system. In general, the present disclosure allows for the user of a beacon that is configured to transmit push notifications to mobile devices in a broadcast area of the beacon. Regardless if the mobile device is registered with the beacon and/or backend system, the beacon will push messages to mobile device in its broadcast area using PUSH notification protocols available on the mobile device. Other methods of communication through short range wireless methods are also likewise contemplated.

If the mobile device has never encountered the beacon before, the beacon can transmit an initial PUSH notification to the mobile device that includes a URL link. This notice is displayed on the mobile device screen. The user can click the URL link in response. When the user clicks the URL link a browser session is opened on the mobile device, which transmits a message back to the backend system. This response message will not include any identification that represents the mobile device due to the fact that this is the first engagement of the mobile device with the beacon system. The backend server recognizes that the mobile device is an unknown or unidentified device. Upon this determination, the backend system will obtain mobile device information that is used to create a fingerprint of the mobile device. The fingerprint is a unique identifier for the mobile device that can be created from any one or a combination of data such as browser type and version, operating system and version, screen resolution, supported fonts, plugins, time zone, language and font preferences, and even hardware configurations, and combinations thereof.

The fingerprint is stored on the mobile device and is utilizable in future communications with the backend system through engagement with the beacon. For example, when the mobile device enters the broadcast area of the beacon in a future event, and the PUSH notification is received, the fingerprint is transmitted when the user clicks on the URL in the PUSH notification.

As the user is utilizing their mobile device and/or engaging in behaviors such as purchasing items, playing games, and so forth, the mobile device transmits information that is indicative of these behaviors to the backend system. The backend system can then begin to assemble and periodically update a user profile that includes empirical data about the user's behaviors.

In some embodiments, this behavioral information is transmitted synchronously when the mobile device is in range of the beacon. In other embodiments, behavioral information can be stored on the mobile device and transmitted to the backend system asynchronously. For example, if the user is engaged in commercial behavior outside the range of a beacon, the behavioral data is stored on the mobile device and is then transmitted to the backend system via a beacon when the mobile device comes within the broadcast range of the beacon and engages with the backend system through the aforementioned PUSH notification and URL response methods.

In some embodiments, in addition to using a fingerprint or other non-cookie related tracking method, the beacon system can also utilize cookies stored on the mobile device to gather behavioral information. Cookies can be used in instances where asynchronous collection and transmission of behavioral data is desired. That is, the cookie can and/or browser can store information that is transmitted to the backend system as needed.

Once a behavioral profile for the mobile device/user is created, the backend system can begin transmitting offers, such as advertisements to the mobile device when the mobile device is within range of the beacon. In another advantage, the unique identification of the mobile device and creation of a behavioral profile using empirical data of the user allows the backend system to leverage these data to create and disseminate highly relevant and/or targeted advertisements to the user.

Figure 6:
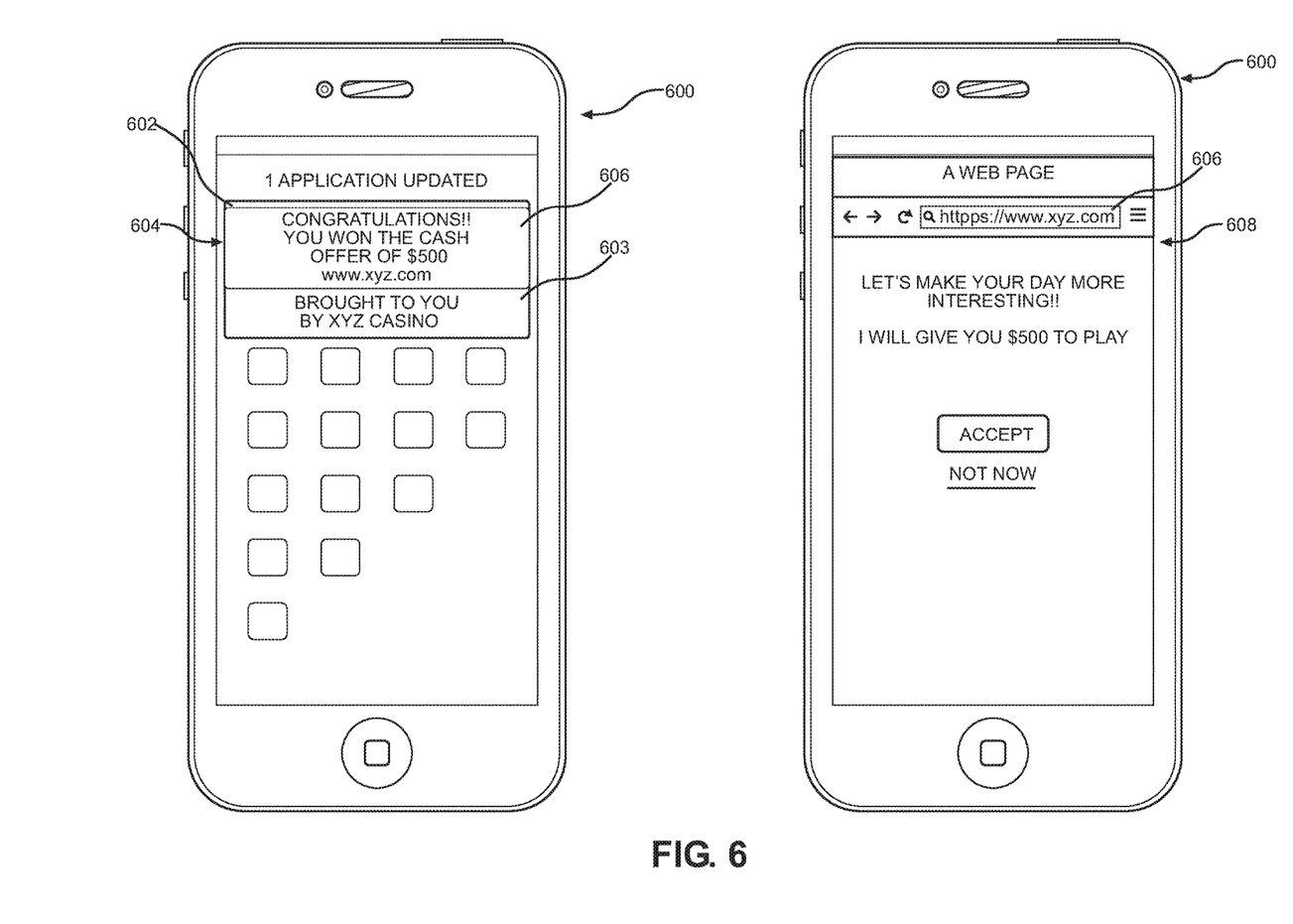
FIG. 6 illustrates notifications and corresponding content displayed on a communication device in accordance with embodiments of the present disclosure.

Also, advantageously, the use of PUSH notifications through common protocols available on many mobile devices allows for communication between the backend system and the mobile device through the beacon without requiring the mobile device to install or execute a specifically configured application to receive offers from the backend system. That is, the backend system can provide initial engagement messages with any mobile device within broadcast range of the beacon. The user is not required to install any applications or connect to any specific devices to receive the PUSH notifications. Merely by interacting with the PUSH notifications the user can selectively choose to receive targeted offerings from the backend system by clicking on the URL and optionally following requests from the backend system for information. Example GUIs are illustrated in FIG. 6 and are described in greater detail herein.

Figure 1:
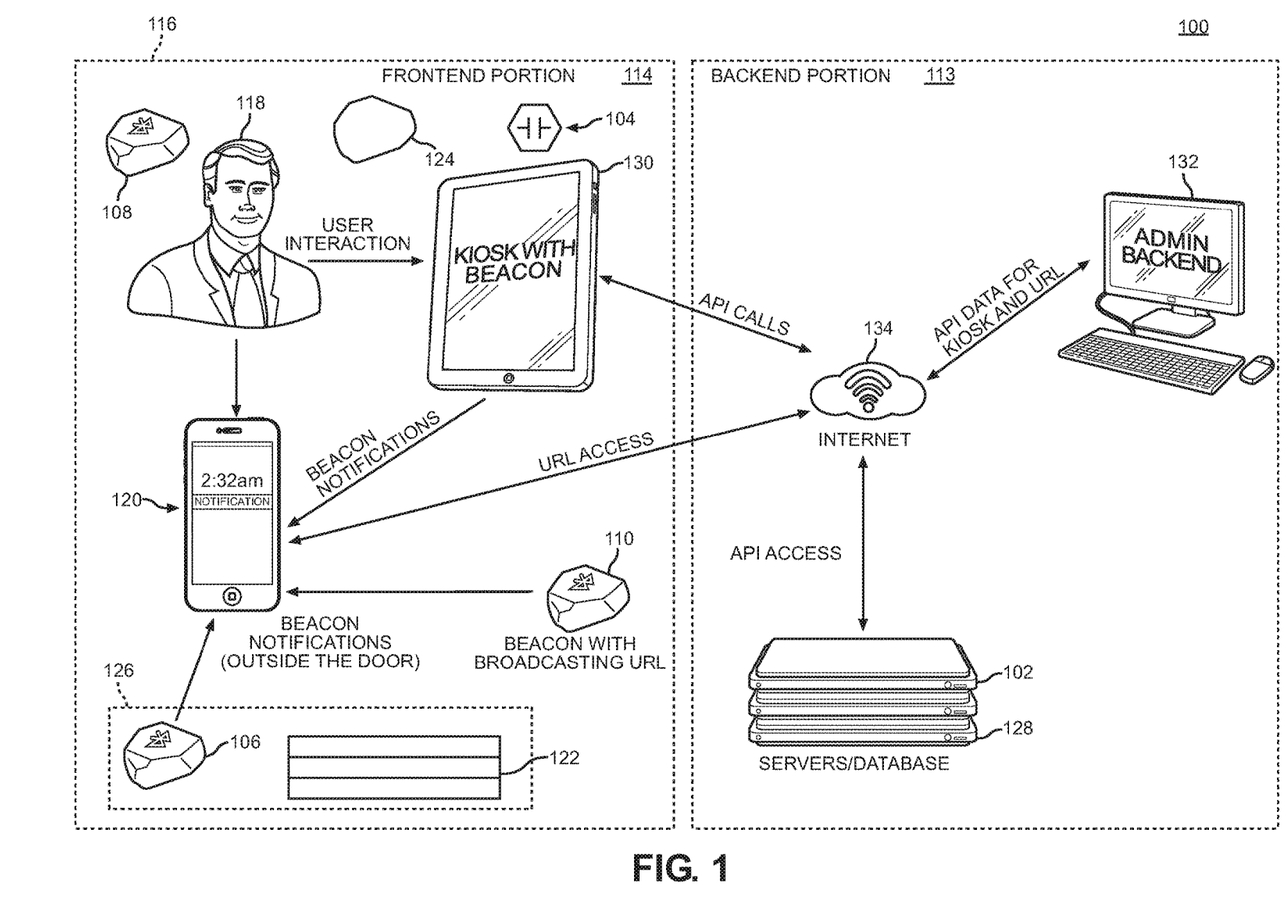
FIG. 1 is a schematic architecture diagram of an example system constructed in accordance with the present disclosure.

FIG. 1 illustrates an example system 100 of the present disclosure, in the form of a distributed or beacon architecture. The system 100 generally comprises a server 102, one or more sensors such as sensor 104, and one or more beacons such as beacons 106-110. The system 100 can include additional or fewer sensors and/or beacons than those illustrated. For illustration, the system 100 is logically divided into a backend portion 113 and a client service or frontend portion 114. The frontend portion 114 is present in an environment 116 where a user 118 is present with their communication device 120 such as a store, casino, hotel, school, and so forth.

In one example embodiment, the beacons 106-110 are distributed around the environment 116 in key locations where discrete content is intended to be provided. For example, beacon 106 is associated with a merchandising shelf 122. Content, including offers for coupons for products sold on the merchandising shelf 122 are triggered when the communication device 120 is in proximity to the merchandising shelf 122 and the user is responsive to an application-less notification from the beacon 106.

In another example, beacon 108 is associated with a display device 124, such as a television screen in a store or casino. When the communication device 120 is in proximity to the display device 124, specific content is displayed on the display device 124. In yet another example, beacon 110 can be placed anywhere in the environment 116 and can be configured to provide content for yet another purpose.

The content provided to the communication device 120 can be based on the nature of the business of the particular environment. In embodiments such as these, the beacon 108 can comprise a dongle that can be installed on the display device 124 such as a television. In general, dongles combine the memory of a USB drive with the communications capability of a beacon plus the ability to communicate via Wi-Fi. Dongles contain no battery but receive their power from a computer or TV and attach through a standard USB port.

A dongle of the present disclosure can be programmed to receive the identifiers of the communication devices in its vicinity and use the server 102 to identify the parameters or attributes of the device. The dongle can then instruct the display device 124 to play a specific message based on the user. The message can be a full video, a crawl or some other on screen activity. Dongles can even communicate with Smartwatches and Smartphones and respond to text messages. In an example use case a dongle can recognize an audience of people at a hotel for a duck hunters convention, show an ad for an outdoors company, and provide discount coupons for those who text 'Duck' to a certain number. Dongles of the present disclosure are powerful tools for real time and local communications.

In one or more embodiments, the server 102 is configured to provide these various types of content based on a variety of factors. In some embodiments, the server 102 is configured to select and provide content based on the beacon encountered. In various embodiments, the delivery of content is controlled, in part, by a logical link such as a URL that is associated with a particular beacon. In one example, each beacon 106-110 is provided with a dedicated and fixed URL (e.g., dedicated logical link). The URL points to content that is delivered to (or accessed by clicking the URL) the communication device 120 based on the provision of a notification. The URL can be fixed to the beacon or can be dynamically allocated by the server 102 in some instances.

A beacon as disclosed herein is configured to send and receive information to and from other devices such as communication devices. Beacons communicate using multiple protocols and can communicate with Smartwatches, sensors, TV dongles, and computers. Some beacons communicate with other beacons and are referred to as mesh beacons. Each of these beacons can be mapped by location. By attaching only one beacon with a computer (or other digital device such as a TV or sensor), the computer can identify which beacons in the mesh test positive for a specific condition.

Figure 7:
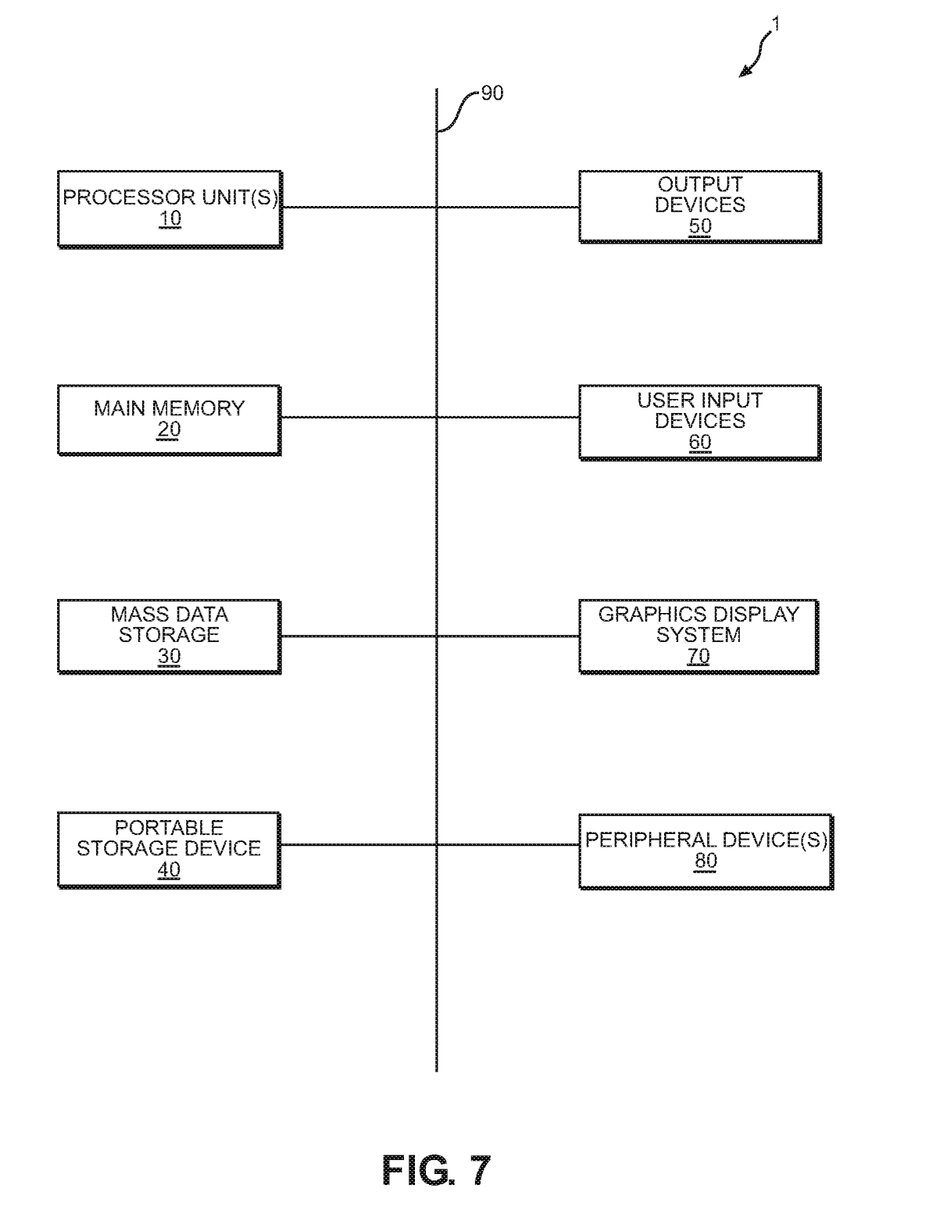
FIG. 7 illustrates an exemplary computer system that may be used to implement some or all embodiments of the system.

Mesh beacons allow computers (e.g., server 102) to identify which beacons are receiving communications from which communication devices. That is, the server 102, or other similar computing device coupled to the server 102, can function as a controller to coordinate functions of IoT devices in a mesh network. The controller can be a computing device that is linked to the server 102 or can communicate with the server 102. An example controller includes a computing device as illustrated in FIG. 7 that has been specifically configured to coordinate and/or control use of IoT devices within an environment. For example, the controller can control the operations of sensors, beacons, and other device in a computing environment that are providing the application-less communication features described herein. In one non-limiting example, the controller could include a device such as an access point or switch within an environment. The controller can communicatively couple with a server (such as server 102), as well as a plurality of beacons or other (IoT) devices. Generally, the controller controls the operations of the IoT devices in the environment while the server is used to control or manage the controller. For example, IoT device behaviors as instruction sets can be pushed to the IoT devices in an environment by provisioning the instruction sets to controller through a server. The controller then distributes IoT device instructions individually to each (or a portion of) the IoT devices.

Geography calculations allow the server 102 to estimate a location of a specific communication device. Consider a hallway 200 with beacons arranged in a grid pattern as in FIG. 2 in view of FIG. 1. The pattern on the left shows the beacons 202a-n laid out in a ceiling of the hallway. The beacons read a code being emitted by a Bluetooth chip of a communication device 120. In one embodiment, a goal includes enticing a guest to visit a gift shop 204. Guest 'XX3Z9' has entered an area of the gift shop from the north, as represented by the dot (representing the communication device 120). The guest tripped five beacons as shown in the highlighted area 206. By identifying a center of gravity of the beacons 202a-n that were tripped, the server 102 can approximate a location of the communication device 120 and determine that the communication device 120 has entered a target zone (e.g., virtual geofence) for gift shop impulse purchases as shown. The server 102 and one or more of the beacons 202a-n can transmit a text (e.g., notification) to the communication device 120 or e-mail the user a notification of an impulse sale at the gift shop. If the database 128 associated with the server 102 identifies that a user associated with the communication device 120 played on a hotel golf course recently, the server 102 can offer the user a deal on hotel golf accessories or apparel in the gift shop 204 or pro shop of the golf course.

Figure 2:
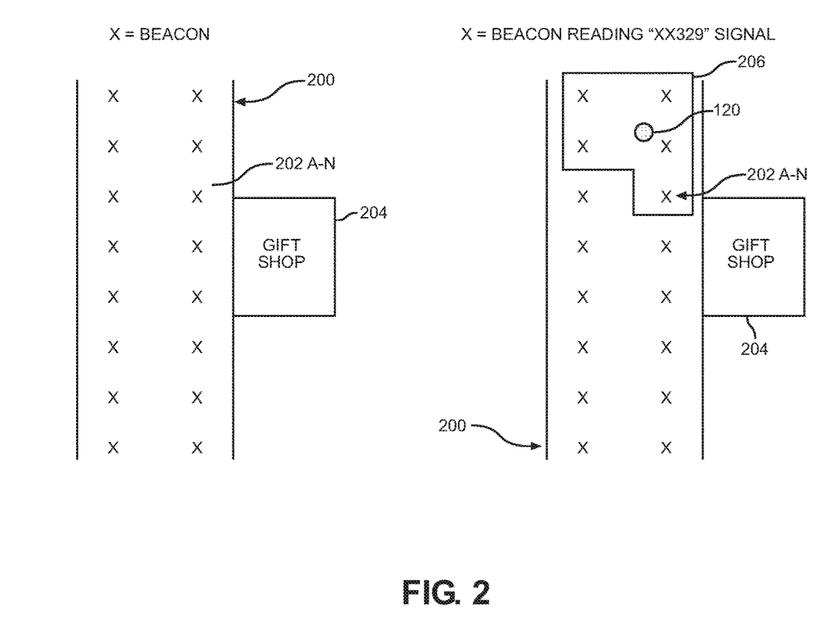
FIG. 2 illustrates the use of a beacon architecture in sensing a communication device and provision of notification and content.

In general, each beacon can be associated with a virtual geofence and the virtual geofence is associated with a unique content type. For example, the content associated with beacons serving the gift shop may provide incentives for items sold in the gift shop, while beacons serving a TV display in another area of the hallway may provide content in the form of a video providing informational content.

Like sensors, mesh beacons can operate independently or as a group. In the event that communication is lost with a backend server, beacons retain their prior instructions. Because beacons communicate using multiple protocols and are powered by tiny batteries, beacons can continue to operate without electrical power or Wi-Fi for extended periods of time.

Referring back to FIG. 1, in more detail, each beacon 106-110 is configured to trigger a notification on the communication device 120. The notification can be triggered when the communication device 120 enters a virtual geofence that surrounds the beacon or otherwise enters short range connection with the beacon. For example, beacon 106 includes a virtual geofence 126 that surrounds the merchandising shelf 122 and can extend to any distance desired. When the communication device 120 contacts or breaches the virtual geofence 126, the beacon 106 will cause a notification to be presented on the communication device 120. The methods and components used to cause the notification on the communication device 120 are described in greater detail infra, but in general the beacon 106 will trigger a notification using a native notification functionality of the communication device 120 or through browser notifications.

The notification generally includes a URL link (either dynamically or permanently provisioned to the beacon) that points to content stored on a database 128. It will be understood that the database 128 can include a local or cloud-based repository. The database 128 can be queried for content in real-time as well using a kiosk 130. In some embodiments the kiosk 130 can utilize an Android application which is used for promoting offers using beacon technology. Customers (users) entering or exiting the environment 116 use the kiosk 130 to initially register with the system 100 and obtain content or opt-in for additional notifications/content through their communication device. To be sure, the kiosk 130 registration process is not required in some embodiments. In embodiments that do include a kiosk, the kiosk 130 is configured to illuminate in response to motion or user presence.

In some embodiments, the kiosk 130 includes a search capability and connects to a real-time cloud database (e.g., database 128), provides analytics, multi-language support, a cloud-based rule engine, video chat (record and save to cloud), bidirectional communication to chat, motion sensing, transmission of various data sent to Smartphone and/or email through an application-less architecture as described herein.

In some embodiments, the kiosk 130 is configured to display an actionable message on the screen such as "Do you want to win today?" with actionable buttons Yes and No. Once the user hits "Yes" the user is directed to a new screen that could include content such as a game of chance. If selected the user is directed to a page with an offer. If the offer is accepted they are directed to a registration page where the user is asked to enter an email identifier and claim their offer.

When the user clicks on an icon or other part of the game they can receive a notification from a beacon associated with the kiosk 130. This notification is received on the communication device 120 allowing the user to perform the same action as on the kiosk 130. For example, the user can click on a notification, open up a URL in a browser of their communication device 120, and receive an offer on the browser. The user can claim the offer by submitting an email address in one example use case. The user can also decline the offer. In some instances actions and/or feedback can be used to tailor future offers including positive feedback (offers that are clicked or accepted) and negative feedback (offers that are ignored or refused).

Administrators can design and create new offers and set expirations for the offers using a backend system 132. Old offers can be replaced with new offers according to a schedule. For example, if an administrator creates 25 offers using the offer creation platform they can set offer active date and time as follows: Offer 1—From 22/01/2017 05:00 pm to 22/01/2017 09:00 pm. Offer 2—From 22/01/2017 09:01 pm to 22/01/2017 11:00 pm. Offer 3—From 22/01/2017 11:01 pm to 22/01/2017 12:30 am. Again, these are merely example schedules and can be adjusted according to the preferences of the administrator.

In some embodiments, offers are time-sensitive. For example, an offer is configured to indicate to a user that they won $100 in credits. This offer can be configured to drop in value by $1 every minute. To stop the clock the user has to complete a full signup or sign-in into an account and accept the offer.

A user who leaves the environment 116 can exit near a door enabled with a beacon (not shown but generally illustrated as beacon 110). Even without signing up through the kiosk 130 the communication device 120 can still receive a notification from the beacon placed by the door. The user receives the notification but with an offer having less value than the offer from the kiosk 130, just as an example.

To be sure, the number and placement of beacons in the environment is subjective and can include any number of beacons providing and number and variety of content.

In some embodiments, the kiosk 130 is connected to the Internet 134 for connectivity back to the server 102 or the database 128. In some instances, users who use the kiosk 130 and users who do not use kiosk 130 both receive notifications through their respective communication devices.

As noted above, notifications can be provided on any given communication device regardless of the operating system or hardware included in the communication device in an application-less manner. In one example embodiment, a notification is presented on the communication device 120 using a native notification functionality of the communication device 120. In some embodiments, the notification is provided using a browser extension or functionality. Again, the provision of notifications occurs entirely without the use of a dedicated application that would ordinarily be provided by a merchant.

In an example embodiment, a beacon passes a file or instruction set that is installed and resides in a digital wallet of the communication device 120. In this instance the communication device 120 is an iPhone and the digital wallet is Apple Wallet. In another example, the notification is triggered using the notifications protocol provided through iOS versions having this functionality.

In yet another embodiment, notifications are presented using a browser extension of a browser client operating on the communication device 120. For example, a Chrome™ browser providing a Chrome Today™ widget on a notification center of an iPhone is used to present notifications from a beacon of the present disclosure.

In iOS, the Today view screen is presented a user swipes down from a top of an iPhone. By default it shows a calendar and stock information, but other application widgets can be installed. If Chrome browser is installed, the Chrome Today widget can be added. If the Chrome Today widget is activated, the first time a beacon of the present disclosure is encountered a website title and description will appear in the Chrome Today widget.

Tapping on the website launches Chrome to the web page address transmitted by the beacon (e.g., fixed or dynamic URL). This web page can be optimized for mobile viewing, serving a welcome message to the visitor that can solicit a download of an application to further take advantage of beacons of the present disclosure. To be sure, an application is not required in order to receive the notifications disclosed herein or to receive content/offers and the use of application is an optional feature. The embodiments above describing a digital wallet pass installation do not require a browser installation to in order to receive and display notifications using a native notification function of a communication device. In these instances, a token such as a cookie are optional.

Again, in general, the systems and methods disclosed herein are not specifically and limited in presenting web pages to a user when in proximity to a beacon, but allow a Smartphone owner to interact with the physical world without the need for a dedicated application related to aspects of the physical world around them.

Thus, instead of 'pushing' information to a user (which may interfere with what they actually want to do at that time and in that location) the present disclosure allows a device owner to find and interact with physical objects in their vicinity without the need for a dedicated application.

By way of example, when a phone enters a beacon's range, the beacon automatically broadcasts a URL which is sent to the phone via PUSH notification. When the phone user clicks on the PUSH notification it opens up a URL, included in the notification, in the browser to show content available that is linked to the URL. For example if a user walks by a movie poster, a beacon broadcasting a URL behind the poster provides a trailer for the movie. This all occurs without the use of an application created by the movie theater or the movie producer/distributor.

In these examples, the beacons will push a notification to a communication device that includes a URL. The URL can be connected to a destination on a server that provides landing page that is configured by the client (referred to in some instances as an authority and delivery system). This system is the backend interface which connects to a database. When using fingerprinting techniques (disclosed in greater detail infra), the system can identify the uniqueness of the user's device and utilize this information for targeted content delivery.

As the user opens the URL, on load, the browser sends the JSON to the authority and delivery system with the fingerprint. For a new user, it sends the fingerprint as blank. For the first time, the authority and delivery system (e.g., server 102 of FIG. 1 for example) sends a payload (e.g., content) with a unique key and the fingerprint and offers payload with some additional data. This fingerprint key is saved into the local storage of the browser of the user's communication device in some instances.

The next time the same user clicks the URL, the system checks a rule engine and sends a customized offers list to the user. To be sure, a rule engine can comprise a dedicated module or system that provides a set of algorithms which checks a device's behavior using previous activities (e.g., actions such as clicks and positive and negative feedback) and customizes future services or content for the particular user. In some instances the provision of future content is generated through use of machine learning. The machine learning utilized herein utilizes (MDP) Markov decision process discrete time stochastic control processes for operations, games, complex simulations analysis for various purposes.

Figure 3:
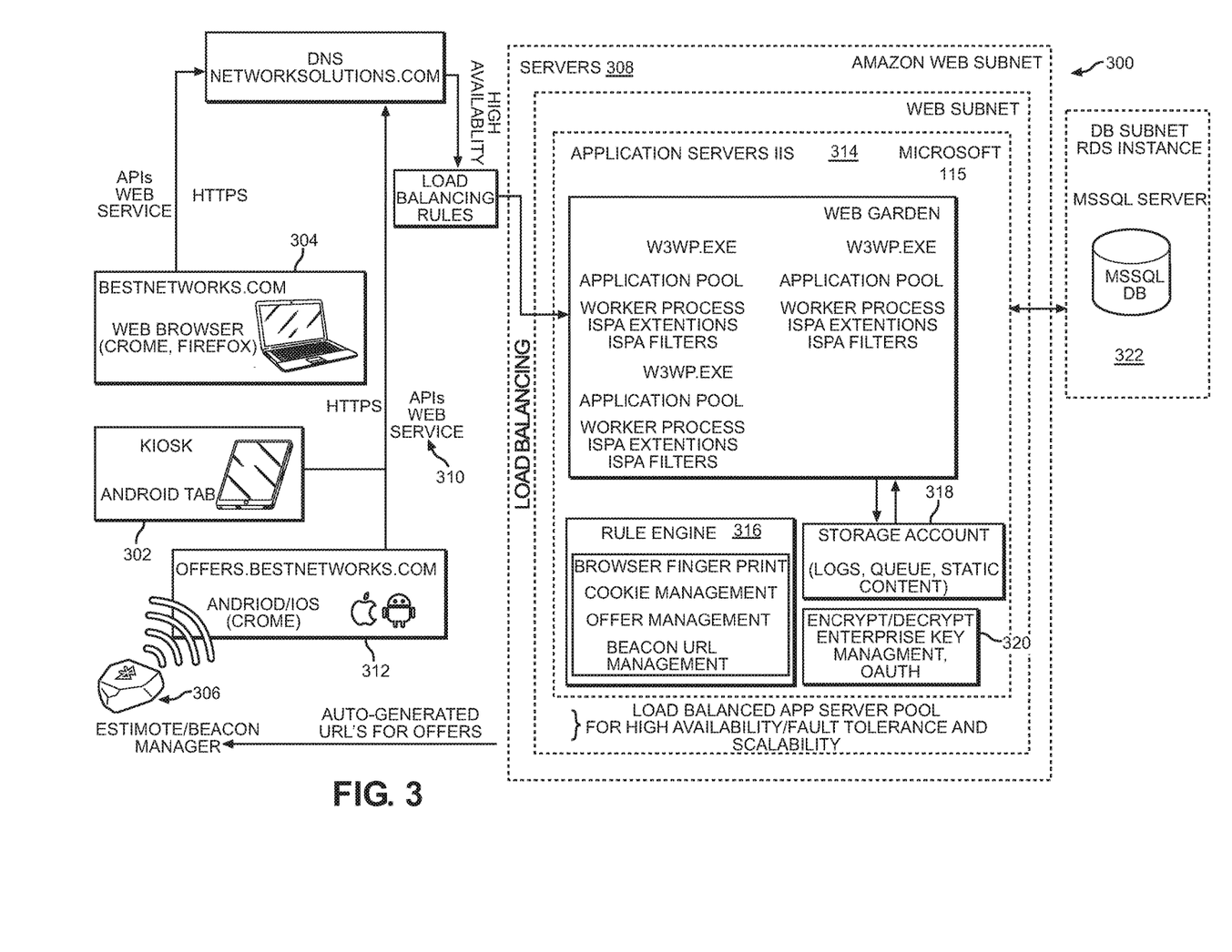
FIG. 3 is a schematic architecture diagram of another example system constructed in accordance with the present disclosure.

FIG. 3 illustrates an example beacon architecture (referred to as a system 300). In general, the system 300 comprises a kiosk 302, a webserver 304, a beacon 306, and a server 308. The kiosk 302 can include any of the features and functions described with respect to the kiosk of FIG. 1. In some embodiments, the kiosk 302 utilizes an application programming interface (API 310) to communicate with a landing page interface 312 provided by the server 308 or another computing device.

In some embodiments, the kiosk 302 provides a user with an initial point of contact where the user can register their communication device and opt-in to receive content. Thus, the kiosk 302 receives initial content preferences for requested content and authorization to deliver content to a specific communication device. This can occur in some instances by presenting a scannable object at the kiosk 302 such as a barcode or quick response (QR) code. When scanned, the communication device can download a token or other application-less means for allowing notifications based on the device-type such as a digital wallet pass. This can include configuring a native notification functionality (e.g., using the digital wallet pass) or enabling notifications through a browser client on the communication device.

After the communication device is configured to receive notifications, the communication device can receive both notifications and/or content from a real-time database based on parameters of the request. In some instances, the real-time results and search can also be performed on the kiosk 302.

To be sure, the system 300 can obtain relevant content for a communication device from real-time services online. Also, the system 300 can collect responsive feedback relative to content provided to a communication device in order to build a device preference profile or record used by a rule engine 316 (disclosed below) to update the content over time based on, for example, negative and positive feedback received.

The beacon 306 provides notifications and access to a dynamically generated URL that directs to the landing page interface 312. The offers or content disclosed herein are provided through the landing page interface 312.

While a beacon 306 is illustrated in FIG. 3, one of ordinary skill in the art will appreciate that the beacon 306 can include any one or a number of different Internet-of-Things (IoT) devices. These devices can include sensors, autonomous computing devices, beacons that can incorporate sensors, and any other computing device that is configured to perform the application-less communication processes disclosed herein. In some embodiments, the application-less communication of information can include the display of a QR code or a barcode that provides the static URL, rather than an IoT computing device.

In various embodiments, the server 308 includes an application server layer 314 that mediates communication with the various beacons and/or kiosks distributed within a given environment. The server 308 also controls beacon/kiosk behavior and controls offer/content delivery through the landing page interface 312. In the exemplary system 300, application server layer 314 utilizes Microsoft 115 software.

In various embodiments, the server 308 comprises a rule engine 316 that manages features such as token generation (which could include a browser cookie as an example), browser/device fingerprinting, offer/content management, and beacon URL management, where URLs are assigned to beacons on a static or dynamic basis. As noted above the rule engine 316 can implement machine learning in order to deliver relevant and real-time content to communication device(s) communicating with the beacons of the system 300.

In some embodiments, the server 308 comprises a storage account 318 and encryption/decryption services 320. The storage account 318 can store event logs, queues for content, static content, and so forth. The encryption/decryption services 320 allow for enterprise key management services and user authorization.

In some instance, the server 308 includes a relational database system 322 that cooperates with the rule engine 316 to store information indicative of communication device behavior and so forth.

Figure 4:
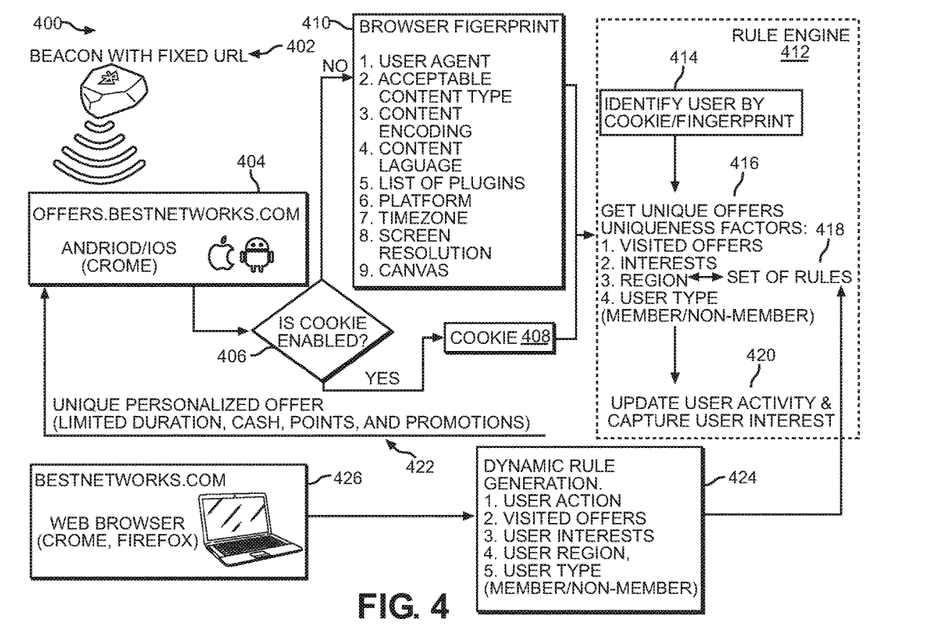
FIG. 4 is a schematic diagram depicting a browser fingerprinting flow with architecture components in accordance with embodiments described herein.

FIG. 4 is a schematic workflow through another example system 400 that specifically illustrates notification features described herein with a stand-alone rule engine. The system 400 includes one or more beacons 402 that are linked to a static or dynamic URL 404 provided through an interface. When receiving requests through the beacon 402, a process 406 is performed where a server determines if a communication device connected to the beacon 402 is using either a cookie 408 or is being detected through fingerprinting 410. In more detail, browser/device fingerprinting allows for a rule engine 412 to determine various parameters such as a user agent, an acceptable content type, content encoding, content language, plugins, operating system (e.g., platform), time zone, screen resolution, and canvas—just to name a few. One of ordinary skill in the art will appreciate the parameters available for fingerprinting of a device.

Once relevant device-related information is gathered, the rule engine 412 utilizes this device-related information to identify a user (e.g., device) through its cookie or fingerprint in process 414. This includes determining if the device is known or not. If the device is not known a new fingerprint can be generated or a cookie provided to the device. The rule engine 412 tracks interactions and device behavior such as real-time location tracking through beacon contact, content feedback, and so forth. A unique offer can be created in a process 416. Rules are generated and stored in process 418 and the updating and tracking of behaviors is illustrated in process 420. Customized content is delivered in process 422.

Dynamic rule generation can also be performed in process 424. This process 424 can occur at the rule engine 412 or in another server that manages or includes the rule engine 412 (see FIG. 3 for an example rule engine embedded in a server). The process 424 includes dynamic rule generation based on device/user behavior collected in reference to an interface 426 that is accessible to the user. This interface 426 can include a kiosk or website access through any device. The interface 426 can present GUIs that collect data from users and/or provide content. As the user provides their user data or interacts with the interface 426, this data is incorporated into process 424 that is responsive to user actions (e.g., clicks), visited offers (e.g., user clicking on URL in a notification), user interests (explicitly provided or determined), user region, and so forth.

Each of the system embodiments disclosed herein is capable of being exemplified and executed within a cloud-based environment, to the extent that such system components are amenable to embodiment in a cloud-based environment. Thus, servers and rule engines can be virtual computing devices in a cloud in some instances.

Figure 5:
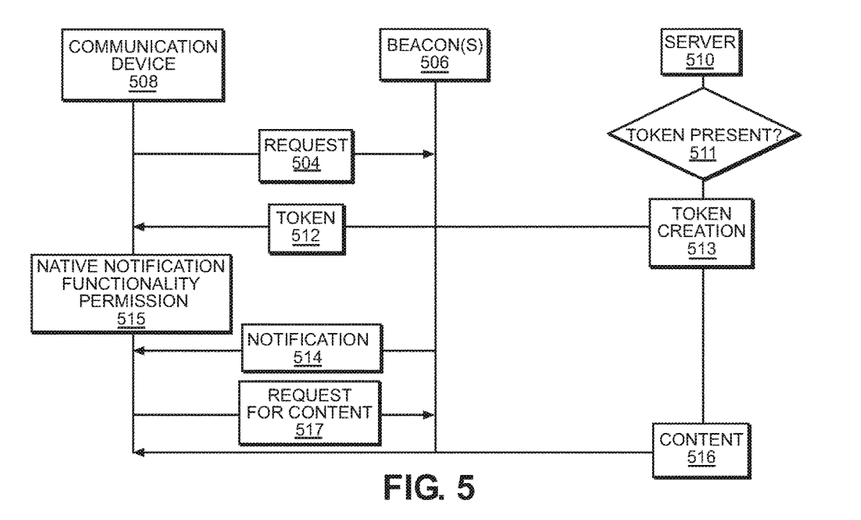
FIG. 5 is a signal flow diagram of an example process of the present disclosure.

FIG. 5 is a signal flow diagram illustrating a method performed in accordance with the present disclosure. In some embodiments, the method includes receiving a request 504 for content by a beacon(s) 506 of a beacon architecture from a communication device 508 that is in short-range communication proximity to the beacon(s). In general, the beacon architecture can include any of the systems described herein that are consistent with the functional descriptions provided in FIG. 5. In general, the beacon architecture illustrated in FIG. 5 can include a server 510 and the beacon(s) 506.

The method also includes a token 512 that is transmitted to the communication device 508 that allows for delivery of notifications to the communication device 508 using a native notification functionality of the communication device 508. As noted herein, this can include a cookie or other means for accessing and using a native notification functionality of the communication device 508. Another example include creating or establishing a digital wallet pass on the communication device 508, which is also understood to include a process for establishing permission to use a native notification function in process 515. The use of digital wallet pass could be used in place of or in combination with the cookie described herein. When used in combination the token is used as a means for gathering device related information and the digital wallet pass is used to establish permission for delivering notifications.

In various embodiments, the request 504 is forwarded to the server 510 and the server 510 determines if a cookie and/or fingerprint (e.g., is this device known?) are present in process 511. If no fingerprint or cookie is present the server 510 can generate a cookie or fingerprint in process 513 and return a token in step 512 as noted above.

In some embodiments, the method includes a notification 514 being transmitted to the communication device 508. As mentioned throughout, the notification comprises a link to the content such as a static or dynamic URL.

In one or more embodiments, the method includes content 516 being transmitted to the communication device 508 based on a selection of the link (request for content 517). In some embodiments the content is displayed on the communication device 508 or on a display that is located proximately to the communication device 508. The content can include any digital content.

FIG. 6 illustrates the provision of a notification using a native notification function, as well as content in response to the notification. In general, communication device 600 comprises a display that includes a notification 602 that is displayed using a native notification functionality. This notification is provided through a beacon of a beacon architecture. The notification 602 includes a message portion 604 and a URL link 606. When the content 608 associated with the URL link 606 is displayed on the communication device 600 in response to a user selecting the link, the user can accept or reject the content, which in this instance includes a targeted offer.

In various embodiments, the notification 602 can be wrapped or branded with a name of an entity providing the notifications and/or content. For example, in some embodiments, the notification 602 can be wrapped with a banner or border 603 that includes a name of a casino or store providing the notifications.

In general, the present disclosure involves the leverage and use of digital wallet pass notifications (native notification functionalities) to create cognitive marketing programs, loyalty and reward programs, product promotions, engagement offers, trivia and games with social media sharing opportunities to attract, influence and retain customers. The beacon architectures allow for device to connect to smart services and terminals.

Beacon architectures of the present disclosure also allow for flexible geographic targeting by using latitude/longitude "boxes" and other geospatial representations in three dimensions. These systems can broadcast notifications to user groups using geo locations, as well as provide phased and delayed effective times and expirations for notifications and/or content.

Also, in some embodiments, the beacon architectures can leverage other notification protocols of devices such as lock screen alerts and notifications.

It will be understood that the components of the various systems described herein can be integrated and/or combined with one another in any manner desired as would be appreciated by one of ordinary skill in the art with the present disclosure before them.

FIG. 7 illustrates an exemplary computer system 1 that may be used to implement some embodiments of the present invention. The computer system 1 of FIG. 7 may be implemented in the contexts of the likes of computing systems, networks, servers, or combinations thereof. The computer system 1 of FIG. 1 includes one or more processor units 10 and main memory 20. Main memory 20 stores, in part, instructions and data for execution by processor units 10. Main memory 20 stores the executable code when in operation, in this example. The computer system 1 of FIG. 1 further includes a mass data storage 30, portable storage device 40, output devices 50, user input devices 60, a graphics display system 70, and peripheral devices 80.

The components shown in FIG. 7 are depicted as being connected via a single bus 90. The components may be connected through one or more data transport means. Processor unit 10 and main memory 20 is connected via a local microprocessor bus, and the mass data storage 30, peripheral device(s) 80, portable storage device 40, and graphics display system 70 are connected via one or more input/output (I/O) buses.

Mass data storage 30, which can be implemented with a magnetic disk drive, solid state drive, or an optical disk drive, is a non-volatile storage device for storing data and instructions for use by processor unit 10. Mass data storage 30 stores the system software for implementing embodiments of the present disclosure for purposes of loading that software into main memory 20.

Portable storage device 40 operates in conjunction with a portable non-volatile storage medium, such as a flash drive, floppy disk, compact disk, digital video disc, or Universal Serial Bus (USB) storage device, to input and output data and code to and from the computer system 1 of FIG. 7. The system software for implementing embodiments of the present disclosure is stored on such a portable medium and input to the computer system 1 via the portable storage device 40.

User input devices 60 can provide a portion of a user interface. User input devices 60 may include one or more microphones, an alphanumeric keypad, such as a keyboard, for inputting alphanumeric and other information, or a pointing device, such as a mouse, a trackball, stylus, or cursor direction keys. User input devices 60 can also include a touchscreen. Additionally, the computer system 1 as shown in FIG. 1 includes output devices 50. Suitable output devices 50 include speakers, printers, network interfaces, and monitors.

Graphics display system 70 include a liquid crystal display (LCD) or other suitable display device. Graphics display system 70 is configurable to receive textual and graphical information and processes the information for output to the display device. Peripheral devices 80 may include any type of computer support device to add additional functionality to the computer system.

The components provided in the computer system 1 of FIG. 7 are those typically found in computer systems that may be suitable for use with embodiments of the present disclosure and are intended to represent a broad category of such computer components that are well known in the art. Thus, the computer system 1 of FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, iOS, ANDROID, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1 may be implemented as a cloud-based computing environment, such as a virtual machine operating within a computing cloud. In other embodiments, the computing system 1 may itself include a cloud-based computing environment, where the functionalities of the computing system 1 are executed in a distributed fashion. Thus, the computing system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:
1. A system, comprising:
a beacon architecture comprising:
  a server;
  a plurality of beacons arranged around an environment, each of the plurality of beacons being associated with a dedicated logical link that is used to provide content;
the server being configured to:
  sense a real-time center of gravity of a communication device from any of the plurality of beacons receiving communications from the communication device, the real-time center of gravity being a location of the communication device within the environment;
  transmit a notification to the communication device, the notification comprising the dedicated logical link to the content based on the real-time center of gravity; and
  transmit the content to the communication device based on a selection of the dedicated logical link; and
a rule engine that is configured to:
  create a behavioral profile for the communication device;
  transmit the content as a target advertisement to the communication device via a beacon of the plurality of beacons, the targeted advertisement being generated in accordance with the behavioral profile;

track negative and positive feedback to the content, the negative and positive feedback being used by the rule engine to adjust the content or future delivery of new content;

determine if the communication device has a fingerprint when a browser session is created using the dedicated logical link; and if no fingerprint for the communication device exists, create a fingerprint for the communication device, and transmit the fingerprint for storage on the communication device.

2. The system according to claim 1, wherein the server is further configured to receive a request for content from any of the plurality of beacons in communication with a communication device that is in short-range communication proximity to at least a portion of the plurality of beacons.

3. The system according to claim 2, wherein the server is further configured to transmit a token to the communication device that allows for delivery of notifications to the communication device using a native notification functionality of the communication device.

4. The system according to claim 3, wherein the token is a cookie.

5. The system according to claim 1, wherein a digital wallet pass is created on the communication device, the digital wallet pass enabling display of the notification on the communication device.

6. The system according to claim 1, wherein the real-time center of gravity is indicative of a location of the communication device relative to the plurality of beacons, wherein each of the plurality of beacons is associated with a portion of the environment, the portion of the environment being defined by a virtual geofence and the virtual geofence is associated with a unique version of the content.

7. The system according to claim 6, wherein when the communication device enters the virtual geofence the unique version of the content is provided to the communication device, by a beacon of the plurality of beacons, through a native notification functionality of the communication device without use of an application installed on the communication device.

8. The system according to claim 7, further comprising a kiosk within the environment, wherein the kiosk is configured to:

receive initial content preferences for the content and a request for the content;

receive the content from a real-time database based on parameters of the request; and update the content over time based on the negative and positive feedback received.

9. The system according to claim 1, wherein the server is further configured to determine display devices that are proximate the real-time center of gravity of the communication device and present the content to one or more of the display devices when the dedicated logical link is selected on the communication device.

* * * * *